Figure 1:
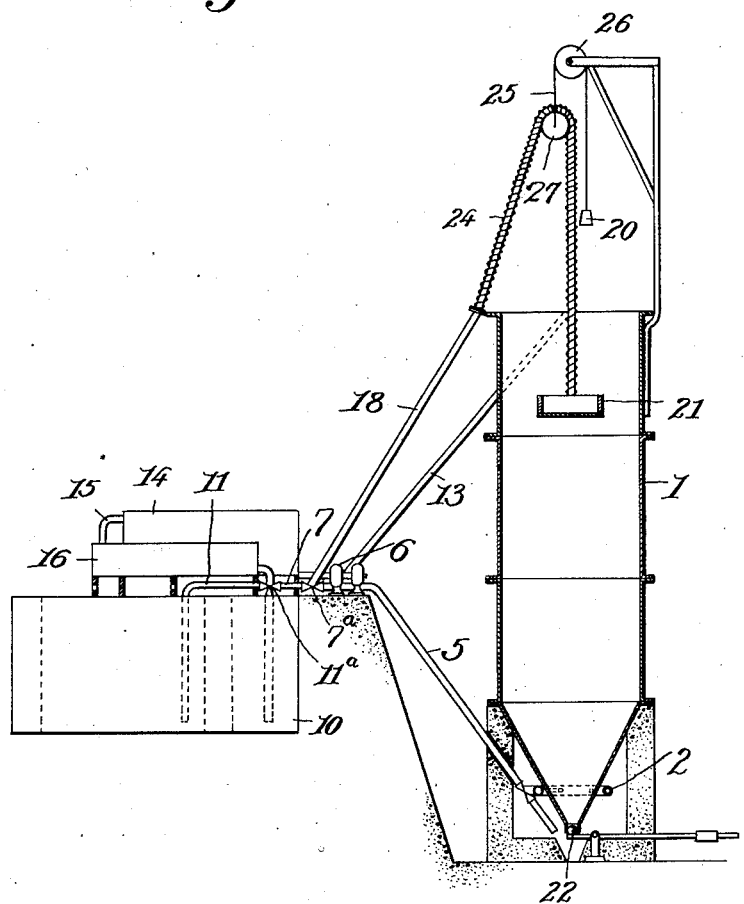

June 19, 1928.

R. KANDA 1,673,982

CYANIDING APPARATUS FOR TREATING GOLD ORES

Filed Sept. 13, 1926   2 Sheets-Sheet 1

INVENTOR.
R. Kanda
BY Marks & Clerk
ATTORNEYS

June 19, 1928.　　　　　　　　　　　　　　1,673,982
R. KANDA
CYANIDING APPARATUS FOR TREATING GOLD ORES
Filed Sept. 13, 1926　　　2 Sheets-Sheet 2
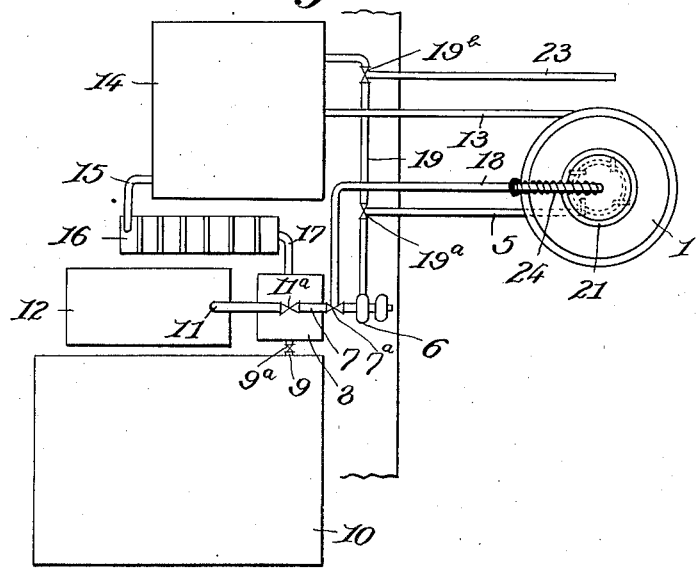
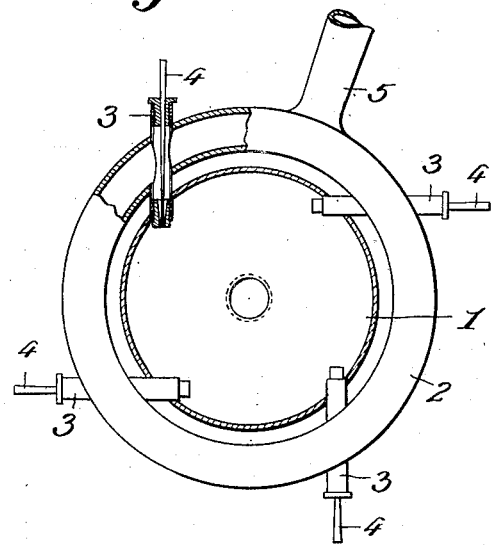
INVENTOR.
R. Kanda
BY
Marks & Clerk
ATTORNEYS.

Patented June 19, 1928.

1,673,982

UNITED STATES PATENT OFFICE.

REIJI KANDA, OF TOKYO-FU, JAPAN.

CYANIDING APPARATUS FOR TREATING GOLD ORES.

Application filed September 13, 1926, Serial No. 135,224, and in Japan September 24, 1925.

This invention relates to a cyaniding apparatus, more particularly a continuous combined agitation and settling apparatus comprising a single tank for use in the all-slime method of cyaniding gold ores, and has for its object to provide a tank, by means of which the agitation and settling of the slime are effected at the same time.

A further object of the invention is to provide an apparatus which is simple in construction and easy to operate, and economical in that the first cost of constructing a cyaniding mill is reduced and the time required for the cyaniding operation is considerably shortened.

This invention provides an absolutely novel cyaniding apparatus in which the continuous combined agitation and settling process for the all-slime cyaniding of gold ores can be performed in only a single tank.

By the use of this new tank, it is possible to omit the use of several auxiliary apparatus usually used before. When employing the type tanks previously used the tank itself serves only for the agitation of the slime usually by means of compressed air in order to set the slime into motion briskly. This method of agitation of the slime generally takes four or five hours to complete and this only to effect agitation. Then the contents of the tank are discharged into another tank, where generally a certain amount of surplus water is removed by means of a thickener. The thickened slime is then sent to a filter press, before conveying the gold in the cyanide solution to the usual zinc box for the precipitation of the gold.

In the tank of the present invention, there is no need for any auxiliary apparatus, because the agitation and settling are performed simultaneously in a single tank, quite unlike any other means previously known for the same purpose. The agitation and settling are accomplished simultaneously by injecting spouts of the cyanide solution of proper strength to extract gold from the slime. The injection of the solution is done by means of a pump on the outside of the tank through a number of nozzles directed toward the inner wall of the tank so that the solution pumped in forcibly strikes against the wall of the container in a tangential direction near the bottom of the container. The tank is provided with an inverted cone-shaped side which leads the water upwards along the wall in a rapid rotary circular motion, thereby creating a strong whirling or spiral movement of the entire contents of the tank. Thus perfect agitation is accomplished; and as the reagent solution comes into contact with every particle of the ores, the gold as well as silver, if any, are extracted into the cyanide solution.

In the accompanying drawings:—
Figure 1 is a diagrammatic side view of the apparatus embodying this invention.
Figure 2 is a plan view.
Figure 3 is a plan of the main parts, partly in section to show an inner view.

Referring to the drawings, 1 indicates a vertical tank, preferably cylindrical in form, and having an inverted conical bottom, around which an annular pipe 2 is arranged near the lower end of the conical bottom. A number of nozzles 3 (see Fig. 3) are provided in the annular pipe 2. Cyaniding solution is pumped by means of a pump 6 into the annular pipe 2 and thence, through openings in the nozzles 3, into the interior of the tank. In this way, cyaniding solution is introduced into the interior of the tank in a direction tangential to the side of the tank.

An air pipe 4, extends into the tank through the nozzles 3, the object of forcing in air being to assist the chemical action during the cyanidation. The annular pipe 2 is connected to a pump 6 through pipes 5, 19; and by turning a three-way cock 19ᵃ at the pump, a connection is made to a return solution tank 8 through a pipe 7, and also by turning another three-way cock 7ᵃ, the connection is made to the solution tank 10 through the pipe 9 and valve 9ᵃ. The return solution tank 8 connects also to a water tank 12 through the pipe 11. A sand filter 14 is connected to the upper part of the tank 1 by a pipe 13 to permit the overflow of the solution which has settled and clarified at the upper part of the tank, to flow thereto. One end of zinc box 16 is connected to the filter 14 by a pipe 15 and the other end is connected to the return solution tank 8 through a pipe 17.

In operation, the tank 1 being filled with the charge, the cyanide solution is injected through the nozzles 3 in such a direction as to cause the jets to forcibly strike against the wall of the tank 1 near its bottom, where the inverted cone-shaped side leads the solution upwards along the wall in a rapid rotary spiral motion, and thereby causing a violent whirling motion of the entire contents in the tank 1. Thus perfect agitation is accomplished at the lower part of the tank; the solution comes into complete contact with every particle of the ore, the gold as well as silver, if any, is extracted into the cyanide solution. The whirling action of the whole mass of the contents in the tank 1, while ascending upwards, gradually lose its speed, and the velocity becomes slower and slower, its motion during rising becoming less near the upper extremity of the tank 1. As the contents becomes calmer in the upper part of the tank nearing its surface, the pulp in the suspension began to fall downwards by gravity, and the solution in the uppermost zone becomes apparently free from movement and clarification takes place. The clarified solution then overflows into the sand filter 14 through the pipe 13, where the solution is further clarified before entering into the zinc box 16, where the gold and silver are precipitated. The solution after the precipitation of gold and silver returns to the return solution tank 8, where the solution is tested and corrected to the normal strength, if necessary, by adding solid cyanide. When the circulation of the solution has been repeated over and over again continuing the pumping in the solution until almost all gold in the ores is extracted the pump 6 is stopped and the contents in the tank 1 are for a short time kept in repose, so that the slime settles. The solution, then, remaining in the upper part of the tank is delivered into the sand filter 14 by means of the pump 6 through a flexible pipe 24, pipe 18, cock 7ª, pipe 19, cocks 19ª and 19ᵇ. The flexible pipe 24 is connected with the upper end of the pipe 18 and provided with a suitable strainer 21 fitted with filter cloth at its inlet and hang over a pulley 27 which is connected with a counter weight 20 by a flexible rope 25 over a pulley 26 mounted on the tank 1 by suitable means, so that the inlet is kept constantly immersed in surface of the solution, so as automatically arranged according to the change of level of the solution. The remaining slime in the tank 1 is washed out through the discharge valve 22 at the bottom of the tank 1 by the water which is injected therein by the pump 6 from the tank 12.

In the case of small plant if there is no thickener, and a pulp containing much surplus water is charged into the tank 1, the whole charge is left in repose for a short time to let the pulp settle. When the water is cleared at the upper part of the tank it is decanted away by means of the pump 6 through the pipes 18, 19 and 23 and shutting or opening the cocks 7ª, 19ª and 19ᵇ.

Having now particularly described and ascertained the nature of the said invention, and in what manner the same is to be performed, I declare that what I claim is:

A cyaniding apparatus comprising a vertical tank having a conical bottom, an annular pipe disposed about said conical bottom, inlet nozzles projecting through said annular pipe and into said tank, said nozzles being disposed at a tangent to the wall of said tank, and communicating with said annular pipe whereby liquid may enter said nozzles from said annular pipe.

In testimony whereof I affix my signature.

REIJI KANDA.